US011600885B2

(12) United States Patent
Noh et al.

(10) Patent No.: US 11,600,885 B2
(45) Date of Patent: Mar. 7, 2023

(54) BATTERY CELL STORAGE CASE AND STORAGE DEVICE INCLUDING SAME

(71) Applicant: LG CHEM, LTD., Seoul (KR)

(72) Inventors: Tae Gyun Noh, Daejeon (KR); Ki Woong Kim, Daejeon (KR); Yoon Jae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 44 days.

(21) Appl. No.: 17/258,481

(22) PCT Filed: Nov. 28, 2019

(86) PCT No.: PCT/KR2019/016578
§ 371 (c)(1),
(2) Date: Jan. 7, 2021

(87) PCT Pub. No.: WO2020/122474
PCT Pub. Date: Jun. 18, 2020

(65) Prior Publication Data
US 2021/0234224 A1 Jul. 29, 2021

(30) Foreign Application Priority Data
Dec. 12, 2018 (KR) .................. 10-2018-0160092

(51) Int. Cl.
H01M 50/00 (2021.01)
H01M 50/244 (2021.01)
H01M 50/24 (2021.01)
F21V 23/02 (2006.01)
H01M 10/42 (2006.01)
(Continued)

(52) U.S. Cl.
CPC ......... H01M 50/244 (2021.01); F21V 23/023 (2013.01); H01M 6/50 (2013.01);
(Continued)

(58) Field of Classification Search
CPC .............. F21V 23/023; H01M 10/425; H01M 10/4285; H02J 7/0063
See application file for complete search history.

(56) References Cited

U.S. PATENT DOCUMENTS

2004/0257035 A1* 12/2004 Chang .................. H01M 50/20
320/107
2017/0033325 A1* 2/2017 Han ..................... H01M 50/258
(Continued)

FOREIGN PATENT DOCUMENTS

JP 2012-015121 A 1/2012
JP 2015-081887 A 4/2015
(Continued)

OTHER PUBLICATIONS

International Search Report (with partial translation) and Written Opinion issued in corresponding International Patent Application No. PCT/KR2019/016578, dated Mar. 31, 2020.
(Continued)

Primary Examiner — Gerald J Sufleta, II
(74) Attorney, Agent, or Firm — Morgan, Lewis & Bockius LLP

(57) ABSTRACT

A battery cell storage case according to the present invention may comprise: a case in which battery cells are stored; and a discharge unit which is electrically connected to the case, is disposed outside the case, and discharges the battery cells, wherein the case comprises: an upper case which has a hollow structure and is open on one side thereof; and a lower case which has a hollow structure and is open on the side facing the open portion of the upper case.

5 Claims, 8 Drawing Sheets

(51) Int. Cl.
*H02J 7/00* (2006.01)
*H01M 6/50* (2006.01)
*H01M 50/213* (2021.01)
*H01M 50/289* (2021.01)
*H01M 50/296* (2021.01)

(52) U.S. Cl.
CPC ..... *H01M 10/425* (2013.01); *H01M 10/4285* (2013.01); *H01M 50/213* (2021.01); *H01M 50/24* (2021.01); *H01M 50/289* (2021.01); *H01M 50/296* (2021.01); *H02J 7/0063* (2013.01); *H01M 2010/4271* (2013.01); *H02J 7/0047* (2013.01)

(56) References Cited

U.S. PATENT DOCUMENTS

| | | | |
|---|---|---|---|
| 2019/0341585 A1* | 11/2019 | Shi | H01M 50/119 |
| 2021/0116079 A1* | 4/2021 | Hunt | H05B 47/25 |

FOREIGN PATENT DOCUMENTS

| | | | |
|---|---|---|---|
| KR | 20100008325 | A | 1/2010 |
| KR | 10-2010-0057876 | A | 6/2010 |
| KR | 10-1019220 | B1 | 3/2011 |
| KR | 10-2012-0051579 | A | 5/2012 |
| KR | 10-2012-0090027 | A | 8/2012 |
| KR | 10-2014-0000398 | A | 1/2014 |
| KR | 10-2015-0049890 | A | 5/2015 |
| KR | 10-2017-0013591 | A | 2/2017 |
| KR | 10-2017-0057759 | A | 5/2017 |
| KR | 10-2018-0110831 | A | 10/2018 |

OTHER PUBLICATIONS

Extended European Search Report issued by the European Patent Office dated Aug. 19, 2021 in corresponding European Patent Application No. 19894799.6.

* cited by examiner

[FIG. 1]
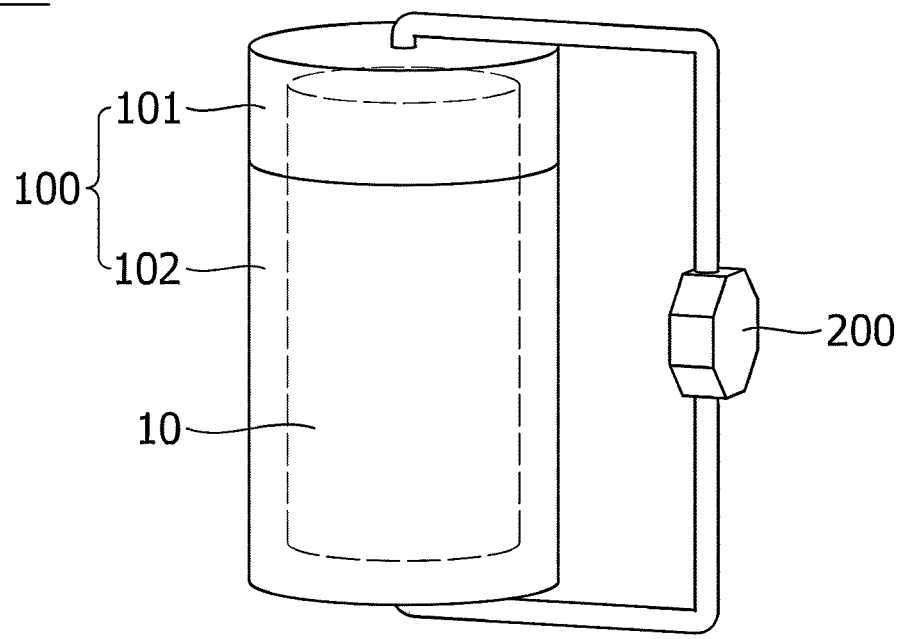

[FIG. 2]
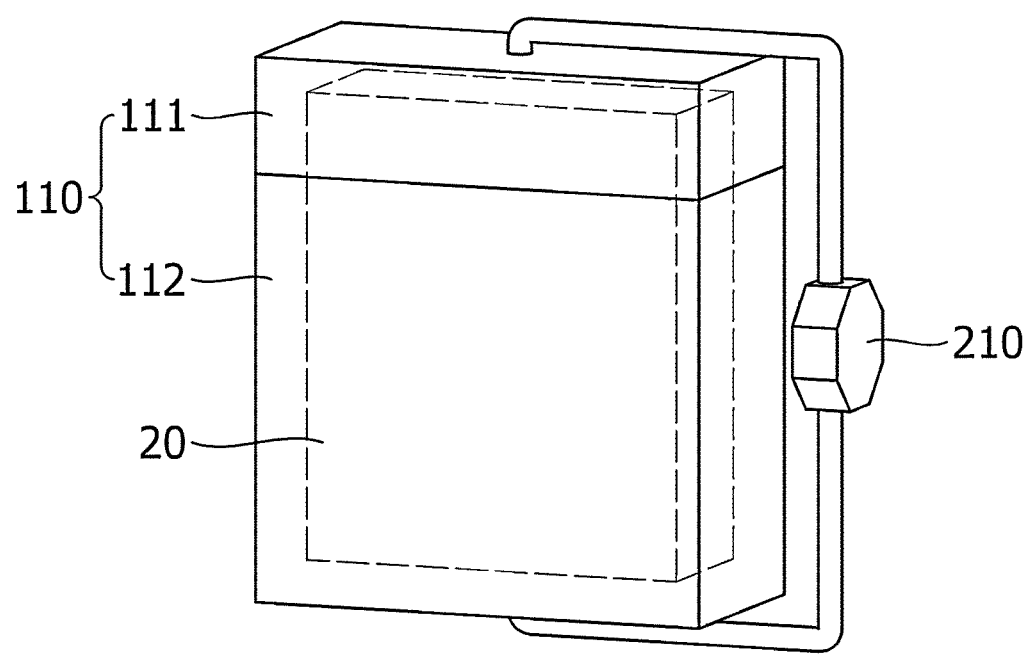

[FIG. 3]
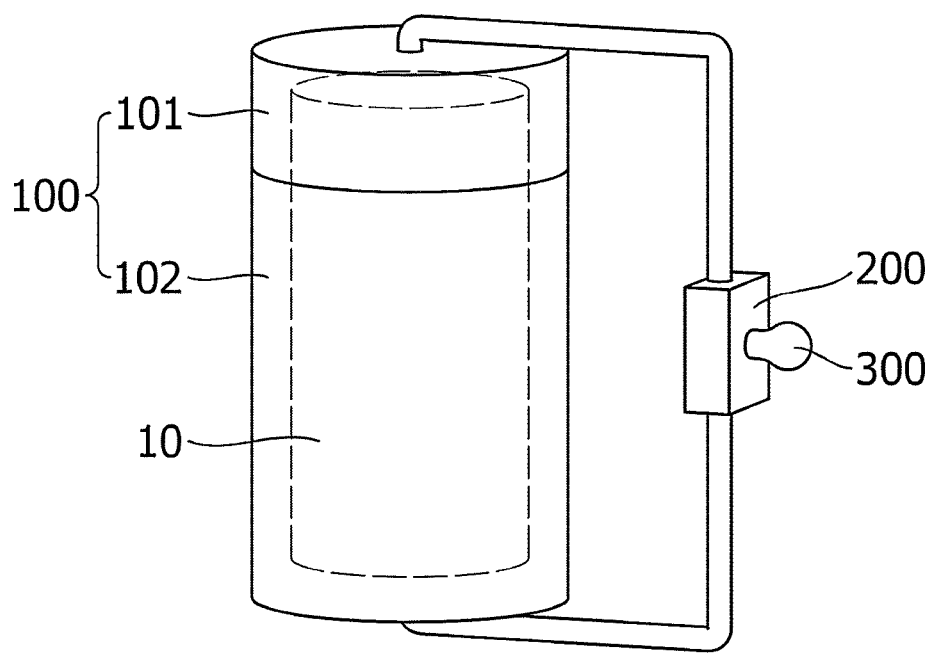

[FIG. 4]
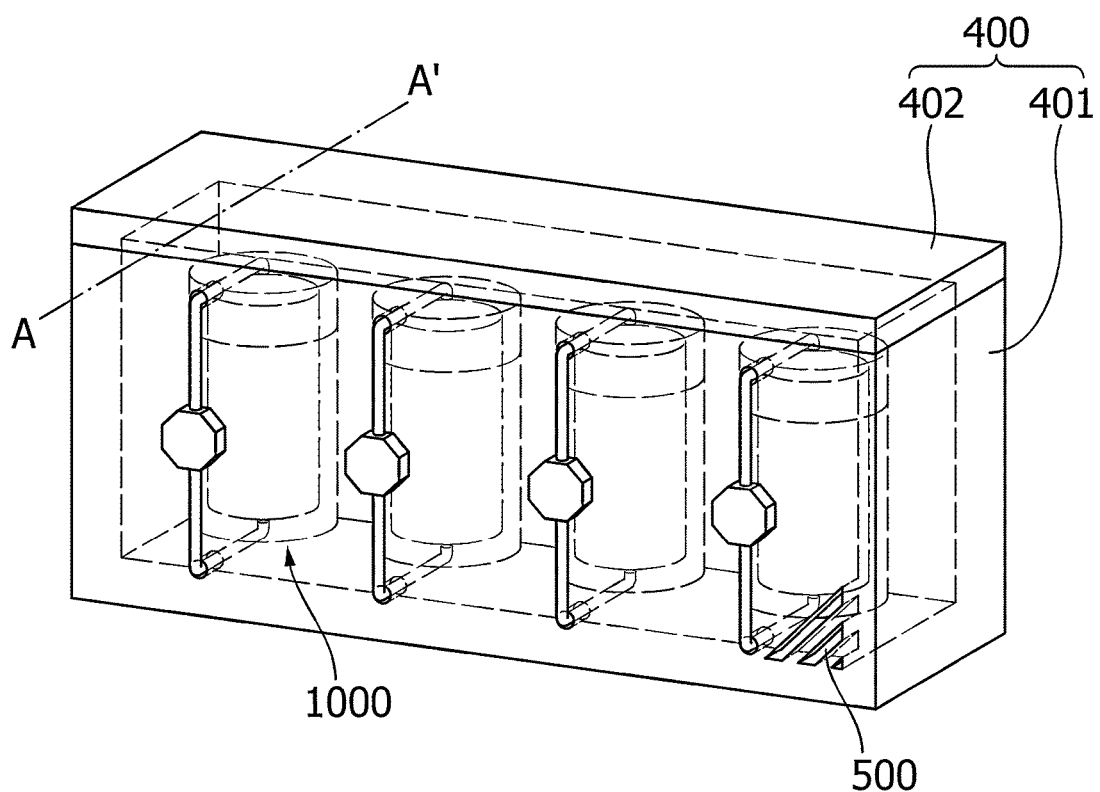

【FIG. 5】
A-A'
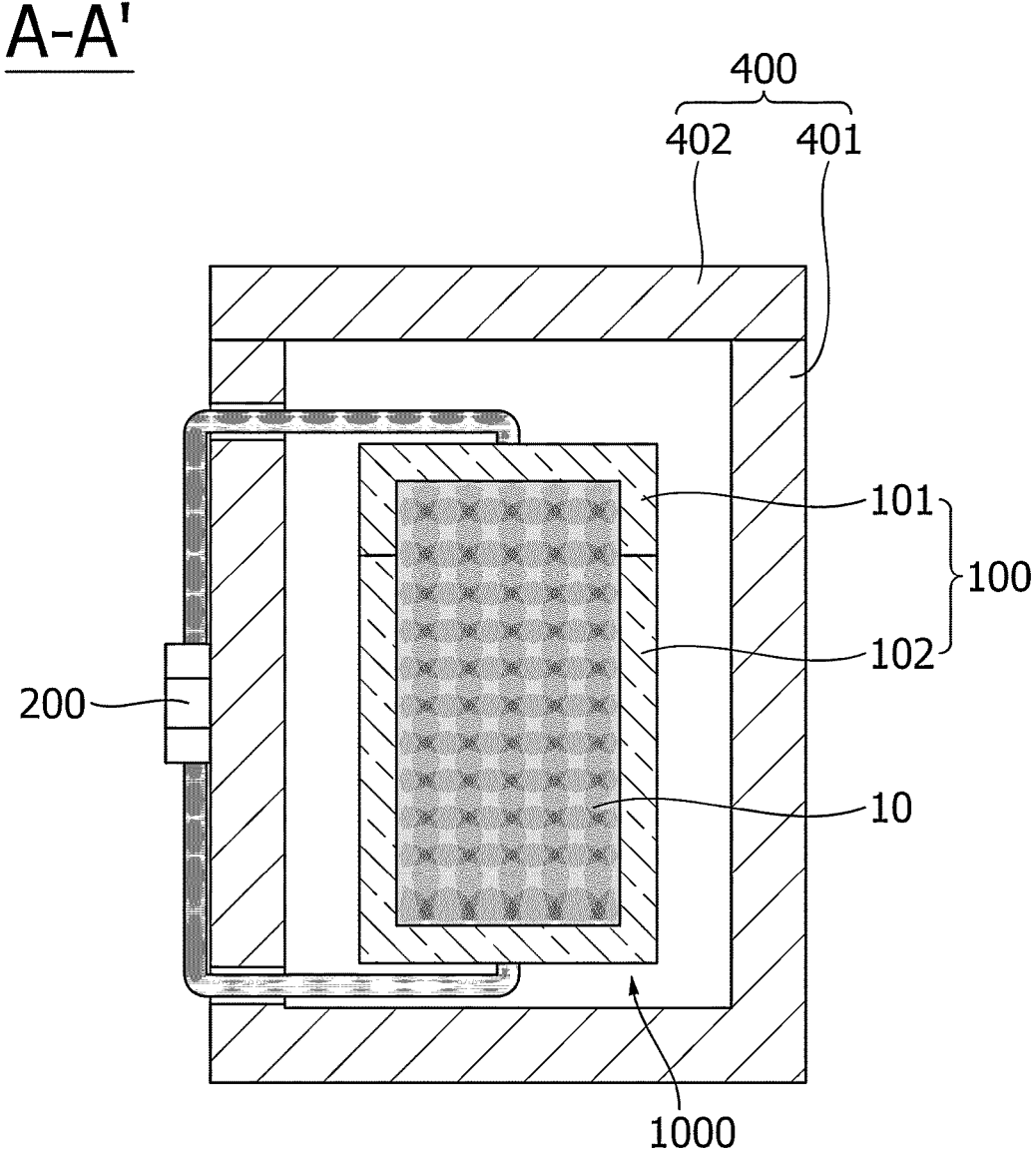

[FIG. 6]
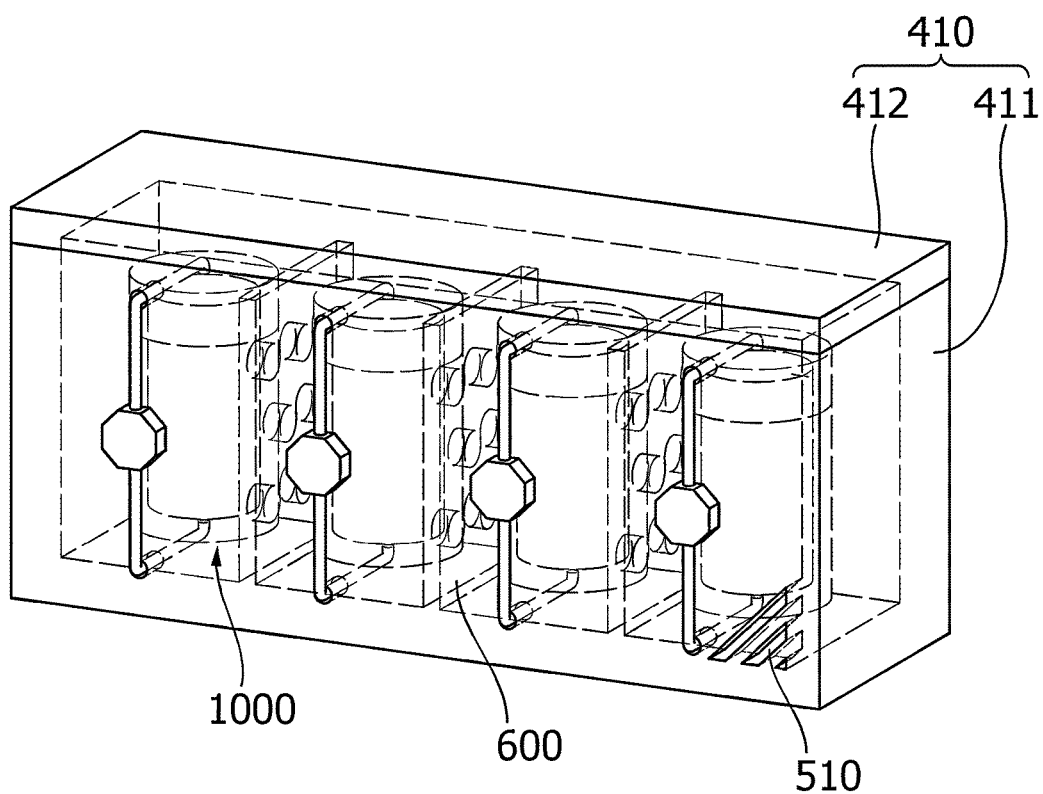

[FIG. 7]
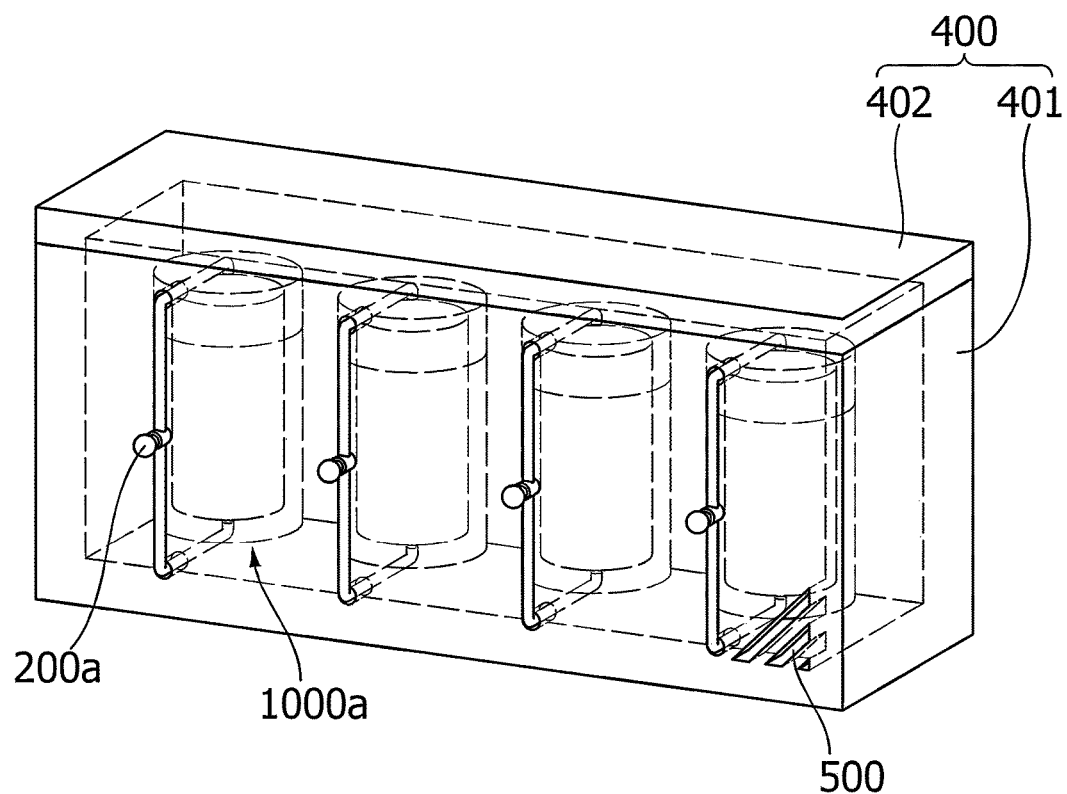

[FIG. 8]
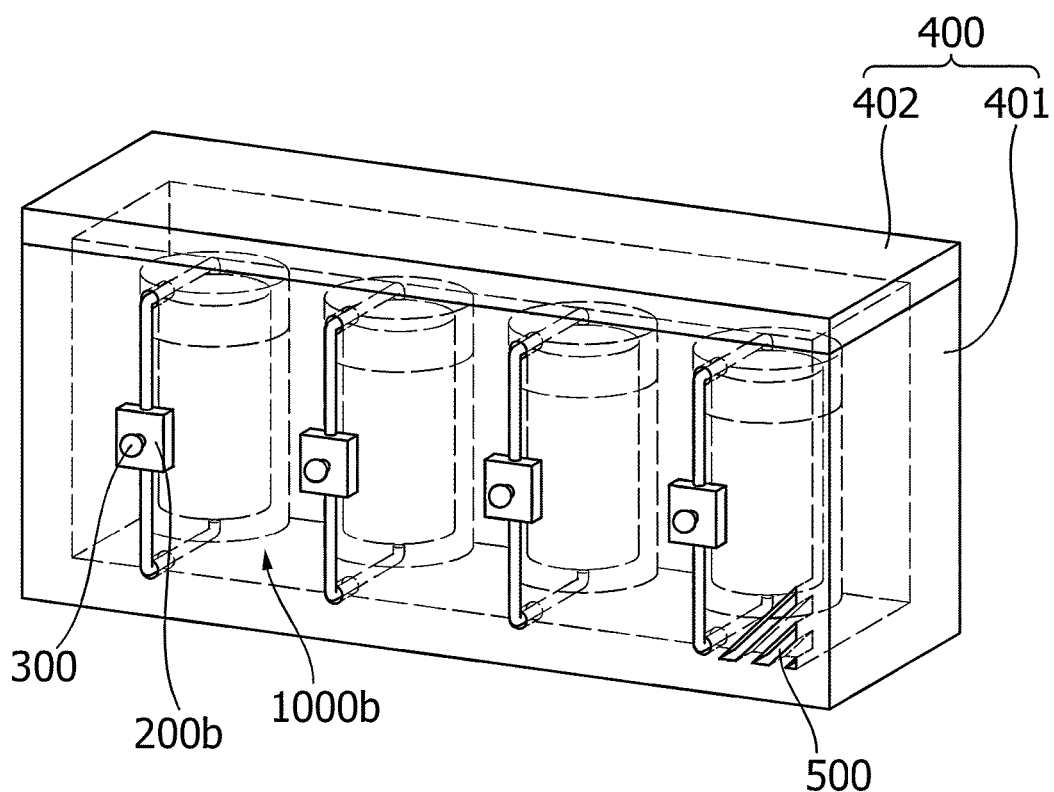

BATTERY CELL STORAGE CASE AND STORAGE DEVICE INCLUDING SAME

TECHNICAL FIELD

This application claims the benefit of priority based on Korean Patent Application No. 10-2018-0160092, filed on Dec. 12, 2018, and the entire contents of the Korean patent application are incorporated herein by reference.

The present invention relates to a storage case of a battery cell and a storage device including the same.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel.

Small devices such as mobile phones and cameras use small battery packs packed with one secondary battery cell, whereas medium and large devices such as laptops and electric vehicles use medium or large battery packs in which two or more secondary battery cells are connected in parallel and/or in series.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase.

On the other hand, the lithium secondary battery has a problem of low stability while having excellent electrical properties. For this reason, many tests have been carried out on products in order to ensure the optimum operating state and stability for secondary batteries.

Many secondary batteries are stored before the stability test. Such secondary batteries in storage generate heat and gas by causing decomposition reactions of active materials and electrolytes, which are battery components, under abnormal operating conditions such as overcharge, overdischarge, exposure to high temperatures, electrical short circuits, and external shocks. Further, the high temperature and high pressure conditions caused by this may further promote the decomposition reaction, which may cause the air to ignite or explode. In addition, abnormal operation in some of a plurality of secondary batteries may cause a chain reaction to other batteries, and the resulting ignition and explosion may lead to large accidents.

Thus, in the storage of the secondary battery for the stability test, there is a demand for a method for preventing ignition, explosion, etc. due to external impact, and ensuring stability from the risk of explosion.

DISCLOSURE

Technical Problem

In order to solve the problems of the prior art as described above, an object of the present invention is to provide a storage case of a battery cell that can prevent fire or explosion caused by the charged energy of the battery cell by including a discharge unit for discharging the battery cell.

In addition, an object of the present invention is to provide a storage device capable of ensuring stability from the risk of explosion, etc. of battery cells by discharging gas that can be generated from battery cell to the outside by including vents while accommodating the storage cases.

Technical Solution

A storage case of a battery cell according to an embodiment of the present invention may include: a case configured to accommodate a battery cell; and a discharge unit configured to be electrically connected to the case and disposed outside the case to discharge the battery cell, wherein the case may include: an upper case of which one side is a hollow structure; and a lower case having a hollow structure in which a side facing an opening of the upper case is opened.

The case may include connection terminals electrically connected to a positive electrode terminal and a negative electrode terminal of the battery cell, and the discharge unit may be electrically connected to the positive electrode terminal and the negative electrode terminal of the battery cell by the connection terminals.

The discharge unit may completely discharge the battery cell.

The storage case may further include a switch unit which is connected to the battery cell and the discharge unit and controls discharge of the battery cell.

The discharge unit may be a lighting element, and the lighting element may be one selected from the group consisting of an incandescent lamp, a fluorescent lamp, and a light emitting diode.

At this time, the battery cell may be discharged by emitting light by the voltage of the battery cell applied to the lighting element.

On the other hand, the discharge unit may be a circuit module including a discharge circuit for discharging the battery cell.

Further, the case may be formed of a material including a flame retardant material or an insulating material.

Further, a storage device of a battery cell according to an embodiment of the present invention may include: a chamber configured to accommodate the storage cases; and exhaust units configured to be formed on at least one portion selected from the group consisting of an upper surface, a lower surface and a side surface of the chamber and discharge gas generated from the battery cell to an outside.

The chamber may have a through portion formed at one side thereof, and a discharge unit of the storage case may be drawn out to of the chamber through the through portion.

A plurality of partition walls may be formed inside the chamber to partition the storage cases.

Herein, at least one through hole may be formed in each of the partition walls.

Further, the chamber may be formed of a material including a flame retardant material or an insulating material.

The chamber may include: a chamber body having a hollow structure with an open top; and a chamber cover coupled with an opening of the chamber body to seal the mounted storage case.

Advantageous Effects

The storage case of the battery cell according to the present invention can prevent the ignition or explosion due to the charged energy possessed by the battery cell by including a discharge unit for discharging the battery cell.

In addition, The storage device according to the present invention can ensure stability from the risk of explosion, etc.

of battery cells by discharging gas that can be generated from battery cell to the outside by including vents while accommodating the storage cases.

BRIEF DESCRIPTION OF THE DRAWINGS

FIG. 1 is a perspective view showing a storage case of a battery cell according to an embodiment of the present invention.

FIGS. 2 and 3 are perspective views showing a storage case of a battery cell according to another embodiment of the present invention, respectively.

FIG. 4 is a perspective view showing a storage device of a battery cell according to an embodiment of the present invention.

FIG. 5 is a cross-sectional view illustrating a cross-section taken along line A-A' of FIG. 4.

FIGS. 6 to 8 are perspective views each showing a storage device of a battery cell according to another embodiment of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In describing the drawings, similar reference numerals are used for similar elements. In the accompanying drawings, the dimensions of the structures are shown in an enlarged scale for clarity of the invention. Terms such as "first" and "second" may be used to describe various components, but the components should not be limited by the terms. The terms are used only for the purpose of distinguishing one component from another. For example, without departing from the scope of the present invention, a first component may be referred to as a second component, and similarly, the second component may also be referred to as the first component. Singular expressions include plural expressions unless the context clearly indicates otherwise.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, an assembled pressurizing jig according to an embodiment of the present invention will be described with reference to the drawings.

FIG. 1 is a perspective view showing a storage case of a battery cell according to an embodiment of the present invention, and FIGS. 2 and 3 are perspective views showing a storage case of a battery cell according to another embodiment of the present invention, respectively.

A storage case of a battery cell according to an embodiment may include a case 100 or 110 and a discharge unit 200 or 210.

The case 100 or 110 accommodates a battery cell 10 or 20 and may include an upper case 101 or 111 of a hollow structure with one opened side and a lower case 102 or 112 of a hollow structure in which the side facing the opened side of the upper case 101 or 111 is opened.

The case 100 or 110 is not limited in shape and size in plan view, and may be adjusted according to the shape and size of the battery cell 10 or 20 accommodated therein. For example, as shown in FIG. 1, when the shape of the battery cell 10 accommodated in the case 100 is cylindrical, the case 100 may also be cylindrical according to the shape of the battery cell 10. On the other hand, as shown in FIG. 2, when the shape of the battery cell 20 accommodated in the case 110 is a cube or a cuboid, the case 110 may have a cube or a cuboid shape.

Meanwhile, the upper case 101 or 111 may be coupled to seal the battery cell 10 or 20 accommodated in the lower case 102 or 112. The upper case 101 or 111 and the lower case 102 or 112 are not particularly limited as long as they can be firmly coupled, but may be coupled by fixing means such as fixing pins, screws, and bolts. In addition, an O-ring or the like may be further used between the upper case 101 or 111 and the lower case 102 or 112 to increase the coupling force of the upper case 101 or 111 and the lower case 102 or 112.

The cases 100 and 110 may be formed of a material including a flame retardant material or an insulating material. Specifically, the inner surface of the case 100 or 110 may be an insulating and heat-insulating material, and a material resistant to high temperature and high pressure, and non-limiting examples thereof may be bakelite, teflon, aerosol, or the like. The outer surface surrounding the inner surface may be made of a material such as stainless steel or metal.

The discharge unit 200 or 210 discharges the battery cell 10 or 20 stored in the case 100 or 110, and is electrically connected to the case 100 or 110, but may be disposed outside the case 100 or 110. Specifically, the case 100 or 110 includes connection terminals electrically connected to the positive electrode terminal and the negative electrode terminal of the accommodated battery cell 10 or 20, and the discharge unit 200 or 210 may be electrically connected to the positive electrode terminal and the negative electrode terminal of the battery cell 10 or 20 by connection terminals of the case 100 or 110. The discharge unit 200 or 210 may completely discharge the battery cell 10 or 20, thereby preventing fire or explosion due to charged energy of the battery cell 10 or 20.

The storage case may further include a switch unit (not shown) which is connected to the discharge unit 200 or 210 and controls discharge of the battery cell 10 or 20. The switch unit may be configured to be mounted on the discharge unit 200 or 210 to turn on/off the discharge unit 200 or 210 by mechanical movement. The switch unit may discharge the battery cell 10 or 20 by turning the discharge unit 200 or 210 into ON state, or may set not to discharge the battery cell 10 or 20 by turning the discharge unit 200 or 210 into OFF state.

For example, the discharge unit 200 or 210 may be a lighting element. In this case, the charged voltage of the battery cell 10 or 20 is applied to the lighting element that is the discharge unit 200 or 210, and the lighting element emits light according to the voltage applied thereto and may indicate that the discharge of the battery cell 10 or 20 is performed. Subsequently, when the charged voltage of the battery cell 10 or 20 is applied to the lighting element to completely discharge the battery cell 10 or 20, the lighting element may indicate that the discharge of the battery cell 10 or 20 is completed by not emitting light. In this case, the lighting device may be one selected from the group consisting of an incandescent lamp, a fluorescent lamp, and a light emitting diode, but is not limited thereto.

As another example, the discharge unit 200 or 210 may be a circuit module including a discharge circuit for discharging the voltage charged in the battery cell 10 or 20. In this case, the discharge circuit may include a discharge resistor and a discharge switch connected in series to the discharge resistor. In addition, the circuit module may include a separate controller for controlling the discharge switch, and the controller may control the discharge switch to discharge the battery cell connected to the discharge circuit.

Meanwhile, as shown in FIG. 3, when the discharge unit 200 is a circuit module, a separate display unit 300 may be connected to the discharge unit 200, and the display unit 300 may be connected to the positive electrode of the battery cell 10 and the discharge voltage of the battery cell 10 may be applied. Specifically, the charged voltage of the battery cell 10 may be discharged by the circuit module, which is the discharge unit 200, and the discharge voltage of the battery cell 10 may be applied to the display unit 300. Thus, the display unit 300 may emit light by the voltage applied thereto to indicate that the discharge of the battery cell 10 is currently performed. Thereafter, when the charged voltage of the battery cell 10 is completely discharged, the display unit 300 may indicate that the discharge of the battery cell 10 has been completed by not emitting light. In this case, the display unit 300 may be one selected from the group consisting of an incandescent lamp, a fluorescent lamp, and a light emitting diode, but is not limited thereto.

Meanwhile, the battery cell 10 or 20 of the present invention may be a secondary battery in which an electrode assembly having a separator interposed between a positive electrode and a negative electrode is sealed in a battery case of a laminate sheet including a metal layer and a resin layer, and such a battery cell may be a lithium secondary battery. In this case, the lithium secondary battery may be a cylindrical secondary battery, a square secondary battery, a pouch-type secondary battery, etc. according to the appearance of the battery case.

Further, the electrode assembly may have a structure in which a plurality of electrodes and a plurality of separators are alternately stacked, and may have one structure selected from the group consisting of folding type, stack type, stack-fold type (SNF), and lamination-stack type (LNS).

For example, the electrode assembly of the lamination-stack structure may include one or more electrodes having a laminate laminated on one or both surfaces thereof. For example, the electrode assembly of the lamination-stack structure may have a structure in which the separator is bonded to one surface of the positive electrode or the negative electrode. In addition, the separator may be bonded to both sides of the positive electrode or both sides of the negative electrode. In addition, the positive electrode, the separator and the negative electrode may be bonded to each other in a state where the separator is interposed between the positive electrode and the negative electrode.

The positive electrode is prepared by applying a mixture of a positive electrode active material, a conductive material and a binder on a positive electrode current collector, followed by drying. If necessary, a filler may be further added to the mixture.

The positive electrode active material may be a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (herein, x is between 0 and 33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}M_xO_2$ (herein, M=Co, Mn, Al, Cu, Fe, Mg, B or Ga, and x=0.01 to 0.3); a lithium manganese compound oxide expressed by $LiMn_{2-x}M_xO_2$ (where M=Co, Ni, Fe, Cr, Zn or Ta, x=0.01 to 0.1) or $Li_2Mn_3MO_8$ (where M=Fe, Co, Ni, Cu or Zn); $LiMn_2O_4$ in which a part of Li is substituted with an alkaline earth metal ion; disulfide compounds; $Fe_2(MoO_4)_3$, etc., but not limited thereto.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like, but the present invention is not limited to these examples.

The binder is added in an amount of 1 to 30% by weight, on the basis of the total weight of the mixture containing the positive electrode active material, as a component that assists in bonding between the active material and the conductive material and bonding to the current collector. Non-limiting examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

The negative electrode may be formed by coating a negative electrode active material on a negative electrode collector and drying the negative electrode active material. Optionally, the negative electrode may further include the above-described components.

Examples of the negative electrode active material include carbon such as non-graphitized carbon and graphite carbon; metal complex oxide such as $Li_xFe_2O_3 (0 \le x \le 1)$, $Li_xWO_2 (0 \le x \le 1)$, $Sn_xMe_{1-x}Me'_yO_z$ (Me: Mn, Fe, Pb, Ge; Me': Al, B, P, Si, groups 1, 2, and 3 of the periodic table, halogen; $0<x\leq1$; $1\leq y\leq3$; $1\leq z\leq8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The separator may be formed of an insulating thin film having high ion permeability and mechanical strength. The process diameter of the separator is generally between 0.01 and 10 μm, the thickness may be between 5 and 300 μm. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

Meanwhile, a polar organic electrolyte and a lithium salt-containing non-aqueous electrolyte solution containing lithium may have been injected into an electrode assembly housed inside the battery case. Non-limiting examples of the electrolyte may be a non-aqueous electrolyte, an organic solid electrolyte, an inorganic solid electrolyte, or the like.

Non-limiting examples of the non-aqueous liquid electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a substance that is soluble in the non-aqueous electrolyte. The examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

Hereinafter, an storage device of a battery cell according to an embodiment of the present invention will be described with reference to the drawings.

FIG. 4 is a perspective view showing a storage device of a battery cell according to an embodiment of the present invention, FIG. 5 is a cross-sectional view illustrating a cross-section taken along line A-A' of FIG. 4, and FIGS. 6 to 8 are perspective views each showing a storage device of a battery cell according to another embodiment of the present invention.

A storage device of a battery cell according to an embodiment may include a chamber 400 or 410 and an exhaust unit 500 or 510.

The chamber 400 or 410 accommodates storage cases 1000, 1000a or 1000b and may include a chamber body 401 or 411 and a chamber cover 402 or 412. Here, the storage cases 1000 of the battery cell are the same as described above, and redundant description will be omitted here.

In this case, the chamber body 401 or 411 may have a hollow structure with an open top. In addition, the chamber body 401 or 411 is not limited in planar shape and size, and may be a cube or a cuboid in shape and size in which the storage cases 1000 of the battery cell are mounted therein. The chamber cover 402 or 412 may be coupled to the opening of the chamber body 401 or 411 to seal the storage cases 1000 mounted in the chamber body 401 or 411. The chamber body 401 or 411 and the chamber cover 402 or 412 are not particularly limited as long as the chamber body and the chamber cover can be firmly coupled, but may be coupled by fixing means such as fixing pins, screws, and bolts. In addition, an O-ring or the like may be further used between the chamber body 401 or 411 and the chamber cover 402 or 412 to increase the coupling force between the chamber body 401 or 411 and the chamber cover 402 or 412.

The chamber 400 or 401 may be formed of a material including a flame retardant material or an insulating material. Specifically, the inner surface of the chamber 400 or 410 may be an insulating and heat-insulating material, and a material resistant to high temperature and high pressure, and non-limiting examples thereof may be bakelite, teflon, aerosol, or the like. The outer surface surrounding the inner surface may be made of a flame retardant material such as stainless steel or metal.

In addition, as shown in FIG. 5, the chamber 400 has a through hole formed at one side thereof, and the discharge unit 200 of the storage case 1000 may be drawn out of the chamber 400 through the through hole.

In addition, as shown in FIG. 6, a plurality of partition walls 600 may be formed in the chamber 410 to partition the storage cases 1000. These partition walls 600 prevent a chain reaction to other battery cells due to abnormal operation in some of the battery cells stored in the plurality of storage cases 1000, thereby preventing ignition and explosion due thereto. In addition, at least one through hole may be formed in each of the partition walls 600. As a result, the partition walls 600 prevent ignition or flame of a battery cell stored in one storage case 1000 from propagating to battery cells stored in other storage cases 1000, and, at the same time, discharge gases by having through holes.

Meanwhile, the exhaust unit 500 or 510 may be formed in at least one portion selected from the group consisting of top, bottom and side surfaces of the chamber 400 or 410. Accordingly, gas generated from the battery cell may be quickly discharged to the outside through the exhaust unit 500 or 510. The shape and size of the exhaust unit 500 or 510 are not particularly limited as long as it can exhaust the gas.

Meanwhile, as shown in FIG. 7, as the lighting element, which is the discharge unit 200a of the storage case 1000a of the battery cell, is drawn out of the chamber 400, the discharge state of the battery cell stored in the chamber 400 can be checked from the outside, which is an advantage. Specifically, the lighting element, which is the discharge unit 200*a*, may indicate that the discharge of the battery cell is currently performed by emitting light by the voltage of the battery cell applied thereto, and when the charged voltage of the battery cell is applied to the lighting element and the battery cell is completely discharged, the lighting element may indicate that the discharge of the battery cell has been completed by not emitting light.

As another example, as shown in FIG. 8, the discharge unit 200*b* of the storage case 1000*b* of the battery cell may be a circuit module including a discharge circuit for discharging the voltage charged in the battery cell. In this case, the separate display unit 300 may be connected to the discharge unit 200*b*, and the display unit 300 may be connected to the positive electrode of the battery cell and the discharge voltage of the battery cell may be applied. Thus, the charged voltage of the battery cell is discharged by the circuit module, which is the discharge unit 200*b*, and the discharge voltage of the battery cell may be applied to the display unit 300. Thus, the display unit 300 may emit light by the voltage applied thereto to indicate that the discharge of the battery cell is currently performed. Thereafter, when the charged voltage of the battery cell is completely discharged, the display unit 300 may indicate that the discharge of the battery cell has been completed by not emitting light.

Although the above has been described with reference to a preferred embodiment of the present invention, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS

1000, 1000*a*, 1000*b*: storage case
100, 110: case
200, 200*a*, 200*b*, 210: discharge unit
300: display unit
400, 410: chamber
500, 510: exhaust unit
600: partition wall

The invention claimed is:

1. A storage device of a battery cell, the storage device comprising:
   a chamber to accommodate one or more storage cases; and
   exhaust units formed on at least one portion selected from the group consisting of an upper surface, a lower surface and a side surface of the chamber and discharge gas generated from the battery cell to an outside,
   wherein:
   the chamber has a through portion formed at one side thereof, and a discharge unit of the storage case is located outside of the chamber and connected to the chamber through the through portion,
   at least one of the storage cases comprises:
      a case to accommodate a battery cell;
         a discharge unit electrically and non-detachably connected to the case and disposed outside the case to discharge the battery cell; and
         a display unit connected to the discharge unit, and connected to positive and negative electrodes of the battery cell,
   the case is a hollow structure and comprises:
      an upper case having an opening on one side, forming an upper part of the hollow structure; and
      a lower case having an opening on a side facing toward the upper case, forming a lower part of the hollow structure,
   the display unit emits light by a voltage applied thereto to indicate that: a discharge of the battery cell is performed; and the discharge of the battery cell is completed.

2. The storage device of claim 1, wherein the storage device further comprises a plurality of partition walls inside the chamber to partition the storage cases.

3. The storage device of claim 2, wherein the storage device further comprises at least one through hole in each of the partition walls.

4. The storage device of claim 1, wherein the chamber comprises a material containing a flame retardant material or an insulating material.

5. The storage device of claim 1, wherein the chamber includes: a chamber body having a hollow structure with an open top; and a chamber cover coupled with an opening of the chamber body to seal the mounted storage case.

* * * * *